US009353003B2

(12) United States Patent
Hohn et al.

(10) Patent No.: US 9,353,003 B2
(45) Date of Patent: May 31, 2016

(54) HYDRAULIC COMPOSITION WITH PROLONGED OPEN TIME

(71) Applicant: HERCULES INCORPORATED, Wilmington, DE (US)

(72) Inventors: Wilfried Adolf Hohn, Erfstadt (DE); Stefan Hucko, Wilnsdorft (DE); Alexander Adolphe Kindler, Ratingen (DE); Vera Louise Nilles, Teutonenstraße (DE); Martin Wunderlich, Langenfeld (DE)

(73) Assignee: Hercules Incorporated, Wilmington, DE (US)

( * ) Notice: Subject to any disclaimer, the term of this patent is extended or adjusted under 35 U.S.C. 154(b) by 30 days.

(21) Appl. No.: 14/208,422

(22) Filed: Mar. 13, 2014

(65) Prior Publication Data
US 2014/0311387 A1    Oct. 23, 2014

Related U.S. Application Data

(60) Provisional application No. 61/787,219, filed on Mar. 15, 2013.

(51) Int. Cl.
| *C04B 22/12* | (2006.01) |
| *C04B 22/16* | (2006.01) |
| *C04B 16/02* | (2006.01) |
| *C04B 28/02* | (2006.01) |
| *C04B 24/16* | (2006.01) |
| C04B 111/00 | (2006.01) |

(52) U.S. Cl.
CPC ............... *C04B 16/02* (2013.01); *C04B 24/16* (2013.01); *C04B 28/02* (2013.01); *C04B 2111/00672* (2013.01)

(58) Field of Classification Search
CPC ........ C04B 16/02; C04B 24/16; C04B 22/12; C04B 22/16
See application file for complete search history.

(56) References Cited

U.S. PATENT DOCUMENTS

| 5,531,825 | A | * | 7/1996 | Gartner | ................. | C04B 24/127 |
| | | | | | | 106/696 |
| 6,162,288 | A | * | 12/2000 | Kindt | ................. | C04B 40/0658 |
| | | | | | | 106/18.11 |
| 7,448,449 | B2 | * | 11/2008 | Di Lullo Arias | ........ | C04B 28/02 |
| | | | | | | 106/724 |
| 7,670,419 | B2 | | 3/2010 | Bohner | | |
| 7,674,332 | B2 | | 3/2010 | Roddy et al. | | |
| 8,303,709 | B2 | | 11/2012 | Yu et al. | | |
| 2004/0094863 | A1 | * | 5/2004 | Burge | ..................... | C04B 28/02 |
| | | | | | | 264/219 |
| 2005/0241539 | A1 | * | 11/2005 | Hagen | .................... | B63H 3/008 |
| | | | | | | 106/805 |
| 2005/0241540 | A1 | * | 11/2005 | Hohn | .................... | B63H 3/008 |
| | | | | | | 106/805 |
| 2005/0241541 | A1 | * | 11/2005 | Hohn | .................... | B63H 3/008 |
| | | | | | | 106/805 |
| 2007/0937925 | | | 6/2006 | Okazawa et al. | | |
| 2007/0037925 | A1 | | 2/2007 | Weitzel et al. | | |
| 2008/1196629 | | | 8/2008 | Yamakawa et al. | | |
| 2011/0203486 | A1 | | 8/2011 | Nicoleau et al. | | |

FOREIGN PATENT DOCUMENTS

| EP | 1686101 | 1/2005 |
| EP | 1980541 | 1/2007 |
| WO | 09933763 | 7/1999 |
| WO | 2004092094 | 10/2004 |

* cited by examiner

*Primary Examiner* — Paul Marcantoni
(74) *Attorney, Agent, or Firm* — Dunlap Codding, P.C.; Shaorong Chen

(57) ABSTRACT

The presently disclosed and claimed inventive concept(s) relates generally to a hydraulic composition with a prolonged open time. More particularly, the composition comprises at least one cement retarder and at least one accelerator. The presently disclosed and claimed inventive concept(s) further relates to a dry mortar composition comprising the hydraulic composition having prolonged open time without deterioration of the other cement tile adhesive properties such as workability, setting time, strength development and sag resistance.

11 Claims, No Drawings

HYDRAULIC COMPOSITION WITH PROLONGED OPEN TIME

CROSS REFERENCE TO RELATED APPLICATIONS

The present application claims the benefit under 35 U.S.C. 119 (e) of U.S. Provisional Patent Application Ser. No. 61/787,219, filed Mar. 15, 2013, the entire content of which is hereby expressly incorporated herein by reference.

BACKGROUND OF THE INVENTION

1. Field of the Presently Disclosed and Claimed Inventive Concept(s)

The presently disclosed and claimed inventive concept(s) relates generally to a hydraulic composition with a prolonged open time. More particularly, the composition comprises at least one cement retarder and at least one accelerator. The presently disclosed and claimed inventive concept(s) further relates to a dry mortar composition comprising the hydraulic composition having prolonged open time without deterioration of the other cement tile adhesive properties such as workability, setting time, strength development and sag resistance.

2. Background and Applicable Aspects of the Presently Disclosed and Claimed Inventive Concept(s)

Tiles have long been used as a finishing material for construction of buildings with a beautiful external appearance, convenience for installation, hygienic properties, convenience for cleaning, maintaining, and managing buildings, and the like.

Traditional cementitious tile adhesives (CTA) used to be simple dry mixtures of cement and sand. The dry mixture is mixed with water to form a wet mortar. These traditional mortars, per se, have poor fluidity or trowellability. Consequently, the application of these mortars is labor intensive.

Moreover evaporation of water into the air and especially the absorption of water through porous substrates on which the CTA is applied lead to a depletion of water in the wet mortar over time. Consequently, not enough water remains in the mortar resulting in very short open time, correction time and even issues with adhesion to the substrate. Additionally, a lack of sufficient water for the proper hydration of cement results in insufficient and incomplete strength development of the CTA.

Nowadays, in general, cellulose ethers are added to the mortar to reduce water loss due to evaporation and absorption of the substrate. Cellulose ethers provide water retention, thus water loss is strongly diminished but not completely prevented. But constant workability, acceptable correction and open time and especially proper strength development is provided.

Open time of a mortar is the time in which a tile can still be placed in the applied mortar and sufficient wetting of the tile with tile adhesive is assured. The end of the open time is indicated by having insufficient wetting of CTA on the backside of the tile. Open time is limited due to drying as well as other chemical and physical reactions related to the set of cement and effects of other used additives like cellulose ethers and redispersible polymer powders.

A method of extending open time by adding organic and/or inorganic cement hydration retarders to a cement mortar has widely been used. Through the addition of retarders the hydration reactions are decelerated or delayed. Consequently the setting and hardening of the mortar is shifted and open time is prolonged.

Setting time is defined in ASTM C266-65. Basically setting time is the time a mortar takes to set or harden at a given thickness. For construction using a cement-based hydraulic composition such as mortar or concrete, the control of setting time is desired with a view to ensuring workability, shortening the construction time and simplifying a curing facility. As demand for a setting accelerating effect in particular is growing so as to shorten the construction time, a setting accelerator having a high setting accelerating effect has been developed.

The delay in cement hydration reactions and consequently in setting time in general comes along with decreased strength development. In general, the slower the cement hydration, i.e., the longer the setting time, the higher is the risk of water loss and thus of insufficient strength development.

If a cementitious tile adhesive has a long open time with addition of a cement retarder, the long open time is established. However, the setting time is undesirably prolonged. So, there is a need to have a cementitious tile adhesive having a long open time with a comparable setting time.

Surprisingly, it has been found that the positive gain in open time by usage of a cement retarder is not reversed if an accelerator is added to compensate the cement set retardation. It has even been found that a retarder-accelerator combination can generate a synergistic effect, meaning that the combination can even have a longer open time compared with a retarder alone.

DETAILED DESCRIPTION

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. Generally, nomenclatures utilized in connection with, and techniques of chemistry described herein are those well known and commonly used in the art. Reactions and purification techniques are performed according to manufacturers specifications or as commonly accomplished in the art or as described herein. The nomenclatures utilized in connection with, and the laboratory procedures and techniques of, analytical chemistry, synthetic organic chemistry, and medicinal and pharmaceutical chemistry described herein are those well known and commonly used in the art. Standard techniques are used for chemical syntheses, chemical analysis, pharmaceutical preparation, formulation, and delivery, and treatment of patients.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, and/or the variation that exists among the study subjects. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

Disclosed herein is a hydraulic composition with prolonged open time. The hydraulic composition can be used in making a cement mortar like a cementitious tile adhesive. Specifically, the hydraulic composition comprises at least one cement retarder and at least one accelerator.

In the hydraulic composition of the presently disclosed and claimed inventive concept(s), the accelerator is a material capable of accelerating hydration of cement and generally classified into inorganic compounds and organic compounds. Suitable inorganic compounds can include, but are not limited to, chlorides such as calcium chloride, sodium chloride and potassium chloride; nitrites such as sodium nitrite and calcium nitrite; nitrates such as sodium nitrate and calcium nitrate; sulfates such as calcium sulfate, sodium sulfate and alum; thiocyanates such as sodium thiocyanate and calcium thiocyanate; hydroxides such as sodium hydroxide, potassium hydroxide and calcium hydroxide; carbonates such as calcium carbonate, sodium carbonate and lithium carbonate; and alumina analogs such as water glass, aluminum hydroxide and aluminum oxide. Suitable organic compounds can include, but are not limited to, amines such as diethanolamine and triethanolamine; calcium salts of organic acids such as calcium formate and calcium acetate; and maleic anhydride.

In the practice of the presently disclosed and claimed inventive concept(s), a cement retarder may be added. Examples of the cement retarder can include, but are not limited to, carboxylic acids and salts thereof such as gluconic acid, glucoronic acid, citric acid, tartaric acid, gluoheptonic acid, mucic acid, malonic acid, malic acid, and crotonic acid; inorganic salts thereof with sodium, potassium, calcium, magnesium and ammonium; saccharides and the corresponding salts such as glucose, sodium gluconate, fructose, galactose, saccharose, xylose, arabinose, ribose, sucrose, mannose; oligosaccharide; dextran; lignosulphonates; phosphonic acids and salts thereof; and boric acid.

A cement retarder can be a condensed phosphoric acid or salt thereof. The condensed phosphoric acid or salt thereof comprises two or more phosphoric acid or phosphate units, respectively. The condensed phosphoric acids and salts thereof can be di-, oligo-, and poly- phosphoric acids and their salts. In one non-limiting embodiment, the condensed phosphate is a polyphosphate. Examples of the polyphosphates can include, but are not limited to, sodium polyphosphate, calcium polyphosphate, magnesium polyphosphate, ammonium polyphosphate, aluminum polyphosphate, manganese polyphosphate, and combinations thereof.

The hydraulic composition further comprises cellulose ether. The cellulose ethers are typically used as water retention agents to achieve good water retention of the resulting wet mortar. Water retention is needed to control the water content for proper hydration of the mortar, including any binder, and to achieve good workability of the mortar. Secondary beneficial effects resulting from correct hydration performance of the mortar are less crack formation and proper strength development of the mortar.

The cellulose ethers in the presently disclosed and claimed inventive concept(s) can be selected from the group consisting of alkylcelluloses, hydroxyalkylcelluloses or alkylhydroxyalkylcelluloses, optionally each with two or more different alkyl and/or hydroxyalkyl substituents, or mixtures of two or more of cellulose derivatives.

Alternatively, or additionally, the hydraulic composition according to the presently disclosed and claimed inventive concept(s) may include one or more water-soluble or at least water-swellable polysaccharides including, for example, but not by way of limitation, pectin, guar gum, guar derivatives like guar ethers, gum arabic, xanthan gum, dextran, cold-water-soluble starch, starch derivatives like starch ethers, chitin, chitosan, xylan, welan gum, succinoglycan gum, diutan gum, scleroglucan gum, gellan gum, mannan, galactan, glucan, alginate, arabinoxylan, cellulose fibers, and combinations thereof.

The following is a list of some examples of cellulose ethers which can be used in context with the presently disclosed and claimed inventive concept(s): hydroxyalkylcelluloses, e.g., hydroxyethylcellulose (NEC), hydroxypropylcellulose (HPC) and hydroxypropylhydroxyethylcellulose (HPHEC); carboxy-alkylcelluloses, e.g., carboxymethylcellulose (CMC); carboxyalkylhydroxyalkylcelluloses, e.g., carboxymethylhydroxyethylcellulose (CMHEC) and carboxymethyl-hydroxypropylcellulose (CMHPC); sulphoalkylcelluloses, e.g., sulphoethylcellulose (SEC) and suiphopropylcellulose (SPC); carboxyalkylsulphoalkylcelluloses, e.g., carboxymethylsulphoethylcellulose (CMSEC) and carboxymethylsulphopropylcellulose (CMSPC); hydroxyalkylsulphoalkylcelluloses, e.g., hydroxyethylsulphoethylcellulose (HESEC), hydroxypropylsulphoethylcellulose (HPSEC) and hydroxyethylhydroxypropylsulphoethylcellulose (HEHPSEC); alkylhydroxyalkylsulphoalkylcelluloses, e.g., methylhydroxyethylsulphoethylcellulose (MHESEC), methylhydroxypropylsulphoethylcellulose (MHPSEC) and methylhydroxyethylhydroxypropylsulphoethylcellulose (MHEHPSEC); alkylcelluloses, e.g., methylcellulose (MC) and ethylcellulose (EC); binary or ternary alkylhydroxyalkylcellulose, e.g., methylhydroxyethylcellulose (MHEC), ethylhydroxyethylcellulose (EHEC), methylhydroxypropylcellulose (MHPC) and ethylhydroxypropylcellulose (EHPC); ethylmethylhydroxyethylcellulose (EMHPC); ethylmethylhydroxypropylcellulose (EMHPC); alkenylcelluloses and ionic and nonionic alkenylcellulose mixed ethers, e.g., allylcellulose, allylmethylcellulose, allylethylcellulose and carboxymethylallylcellulose); dialkylaminoalkylcelluloses, e.g., N,N-dimethylaminoethylcellulose and N,N-diethylaminoethylcellulose; dialkylaminoalkylhydroxyalkylcelluloses, e.g., N,N-dimethylaminoethylhydroxyethylcellulose and N,N-dimethylaminoethylhydroxypropylcellulose; aryl- and arylalkyl- and arylhydroxyalkylcelluloses,e.g., benzylcellulose, methylbenzylcellulose and benzylhydroxyethylcellulose; as well as reaction products of the above-stated cellulose ethers with hydrophobically modified glycidyl ethers, which have alkyl residues with $C_3$ to $C_{15}$ carbon atoms or arylalkyl residues with $C_7$ to $C_{15}$ carbon atoms.

In accordance with the presently disclosed and claimed inventive concept(s), the cellulose ether can be MHEC and MHPC, having an aqueous Brookfield solution viscosity of 500 to 130,000 mPas, as measured on a Brookfield RVT viscometer at 20° C., 20 rpm and a concentration of 2 wt % using the appropriate spindle.

In accordance with the presently disclosed and claimed inventive concept(s), the hydraulic composition may have additional additives of between about 0.005 and about 80 wt %. In one non-limiting embodiment, the amount of the additive(s) can be between about 0.5 and about 30 wt %. The additives used can include, but are not limited to, organic or inorganic thickening agents and/or secondary water retention agents, anti-sag agents, air entraining agents, wetting agents, defoamers, superplasticizers, dispersants, calcium-complexing agents, water repellants, redispersible powders, biopolymers, fibers, calcium chelating agents, fruit acids, and surface active agents. Any of water-reducing agents (fluidizing or dispersing agents or super plasticizer) may be used in the hydraulic composition herein. Examples of water-reducing agents can include, but are not limited to, melamine-based, lignin-based, and polycarboxylate-based compounds. Defoamers used herein can include, but are not limited to, polyether, silicone, alcohol, mineral oil, vegetable oil, and non-ionic surfactants.

Other specific examples of additives can include, but are not limited to, gelatin, polyethylene glycol, casein, lignin sulfonates, naphthalene-sulfonate, sulfonated melamine-formaldehyde condensate, sulfonated naphthalene-formaldehyde condensate, polyacrylates, polycarboxylate ether, polystyrene sulphonates, phosphates, phosphonates, calcium-salts of organic acids having 1 to 4 carbon atoms such as calcium formate, salts of alkanoates, aluminum sulfate, metallic aluminum, bentonite, montmorillonite, sepiolite, polyamide fibers, polypropylene fibers, polyvinyl alcohol, and homo-, co-, or terpolymers based on vinyl acetate, maleic ester, ethylene, styrene, butadiene, vinyl versatate, and acrylic monomers.

The hydraulic composition according to the presently disclosed and claimed inventive concept(s) can be prepared by a wide variety of techniques known for one of ordinary skill in the art. Examples can include, but are not limited to, simple dry blending, combining different components during spray drying process, spraying of solutions or melts onto dry materials, co-extrusion, or co-grinding.

The hydraulic composition according to the presently disclosed and claimed inventive concept(s) can also be used in making a dry mortar formulations, cementitious tile adhesives, cement based renders, water proofing membranes, and mineral coatings for insulation systems like ETICS. The hydraulic composition can be admixed to the components of a dry cement mortar composition when manufacturing the dry cement mortar.

In accordance with the presently disclosed and claimed inventive concept(s), the dry cement mortar comprises a hydraulic cement component present in the amount of about 10-85 wt % based on the total weight of the dry cement mortar. In one non-limiting embodiment, the amount of cement component added is about 25 to 80 wt % based on the total weight of the dry cement mortar. In another non-limiting embodiment, the amount of cement component added is 30 to 75% by weight. In yet another non-limiting embodiment, the amount of cement component added is 35 to 70% by weight.

Examples of the hydraulic cement component can include, but are not limited to, Portland cement, Portland-slag cement, Portland-silica fume cement, Portland-pozzolana cement, Portland-burnt shale cement, Portland-limestone cement, Portland-composite cement, blast furnace cement, pozzolana cement, composite cement, and calcium aluminate cement.

In accordance with the presently disclosed and claimed inventive concept(s), the dry cement mortar further comprises an aggregate material. Examples of the aggregate material can be, but are not limited to, silica sand, dolomite, limestone, lightweight aggregates (e.g. perlite, expanded polystyrene, hollow glass spheres), rubber crumbs (recycled from car tires), and fly ash. For the dry cement mortar of the presently disclosed and claimed inventive concept(s), the aggregates can also have a particle size of up to 5 mm. In one non-limiting embodiment, the aggregates can have a particle size of up to 2 mm.

The aggregate can be a fine aggregate. By "fine" is meant that the aggregate materials have particle sizes up to about 2.0 mm, or up to about 1.0 mm. In one non-limiting embodiment, the fine aggregates can have a particle size of up to 1 mm. The lower limit of particle size can be at least 0.0001 mm. In one non-limiting embodiment, the lower limit of particle size can be at least 0.001 mm.

The amount of aggregate can be about 20-90 wt % based on the total weight of the dry cement mortar. In one non-limiting embodiment, the amount of aggregate added is 25 to 70 wt % based on the total weight of the dry cement mortar. In another non-limiting embodiment, the amount of aggregate added is 30 to 65 wt %. In yet another non-limiting embodiment, the amount of aggregate is about 50-70 wt %.

For a dry cement mortar, the accelerator can be added in amounts of 0.01 to 1.0% by weight based on the total weight of the dry cement mortar. In one non-limiting embodiment, the amount of accelerator added is 0.05 to 0.5 wt % based on the total weight of the dry cement mortar. In another non-limiting embodiment, the amount of accelerator added is 0.1 to 0.3 wt %.

The amount of cement retarder added can be in a range of 0.001 to 0.5% by weight based on the total weight of the dry cement mortar. In one non-limiting embodiment, the amount of cement retarder added is 0.005 to 0.3 wt % based on the total weight of the dry cement mortar. In another non-limiting embodiment, the amount of cement retarder added is 0.01 to 0.05 wt %.

The amount of water-reducing agent added can be in a range of about 0.01 to about 5% by weight based on the total weight of the dry cement mortar. An optimum amount may be determined depending on its type or grade. In the case of the tile cement mortar compositions, the water-reducing agent is used because it is necessary to acquire a good fluidity with a minimal amount of water. If the amount of water-reducing agent used is too small, it may not be effective for its purpose. If the amount of water-reducing agent used is too large, it may cause material separation such as bleeding and aggregate settle-down, leading to a strength drop or efflorescence.

The amount of defoamer added is in a range of 0.1 to 5% by weight based on the total weight of dry cement mortar. In one non-limiting embodiment, the amount of defoamer added is in a range of 0.2 to 4% by weight based on the total weight of dry cement mortar.

In the practice of the presently disclosed and claimed inventive concept(s), a polymer emulsion may be used, if necessary, for improving the adhesion to the body or wear resistance. The polymer emulsion may take the form of liquid or redispersible powder. Most emulsions that are commercially available as the premix for on-site mixing are polymer emulsions of the powder (redispersible) type.

Water-redispersible polymer powders are those which break down into primary particles in water, and then dispersed ("redispersed") in water. The use of such water-redispersible polymer powders in dry-mix mortars is common and known to improve, depending on the type and addition rate, the adhesion on all kinds of substrates, the deformability of the mortars, the flexural strength and the abrasion resistance, to name only a few of several properties. The polymer powder can comprise one or more compounds selected from homopolymers and/or copolymers and/or terpolymers of one or monomers selected from the group of vinyl esters of unbranched or branched $C_1$-$C_{15}$ alkylcarboxylic acids, (meth)acrylic ester of $C_1$-$C_{15}$ alcohols, vinylaromatics, olefins, dienes, and vinyl halogenides.

In one non-limiting embodiment, vinyl esters can be vinyl acetate; vinyl propionate; vinyl butyrate; vinyl 2-ethylhexanoate; vinyl laurate; 1-methylvinyl acetate; vinyl pivalate; vinyl acetate-ethylene copolymers with an ethylene content of from about 1 to about 60% by weight; vinyl ester-ethylene-vinyl chloride copolymers with an ethylene content of from about 1 to about 40% by weight and a vinyl chloride content of from about 20 to about 90% by weight; vinyl acetate copolymers with from about 1 to about 50% by weight of one or more copolymerizable vinyl esters such as vinyl laurate, vinyl pivalate, and vinyl esters of alpha-branched monocarboxylic acids having from about 5 to about 11 carbon atoms, especially Versatic acid vinyl esters, which may also contain from about 1 to about 40% by weight of ethylene; and vinyl acetate-acrylic ester copolymers with from about 1 to about 60% by weight of acrylic ester, especially n-butyl acrylate or 2-ethylhexyl acrylate, and which may also contain from 1 to 40% by weight of ethylene.

If desired, the polymers may also contain from about 0.1 to about 10% by weight, based on the overall weight of the polymer, of functional comonomers. These functional comonomers may include, but are not limited to, ethylenically unsaturated monocarboxylic or dicarboxylic acids such as acrylic acid; ethylenically unsaturated carboxyamides such as (meth)acrylamide; ethylenically unsaturated sulfonic acids and/or their salts such as vinylsulfonic acid; polyethylenically unsaturated comonomers such as divinyl adipate, diallyl maleate, allyl methacrylate and triallyl cyanurate; and/or N-methylol(meth)acrylamides and their ethers, for example their isobutoxy or n-butoxy ethers.

Methacrylic esters or acrylic esters can be, but are not limited to, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and copolymers of methyl methacrylate with 1,3-butadiene.

Vinylaromatics can be, but are not limited to, styrene, methyistyrene, and vinyltoluene, styrene-butadiene copolymers and styrene-acrylic ester copolymers such as styrene-n-butyl acrylate or styrene-2-ethylhexyl acrylate, each with a styrene content of from about 10 to about 70% by weight.

Vinyl halide can be vinyl chloride. Vinyl chloride polymers can be, but are not limited to, vinyl ester/vinyl chloride/ethylene copolymers, vinyl chloride-ethylene copolymers and vinyl chloride-acrylate copolymers.

In one non-limiting embodiment, olefins can be ethylene and propylene, and dienes can be 1,3-butadiene and isoprene.

The polymers can be prepared in a conventional manner. In one non-limiting embodiment, the polymer can be prepared by an emulsion polymerization process. The dispersions used may be stabilized with emulsifier or else with a protective colloid, an example being polyvinyl alcohol. To prepare the water-redispersible polymer powders, the polymer dispersion obtainable in this way can be dried. Drying may be conducted by means of spray drying, freeze drying, or by coagulation of the dispersion and subsequent fluidized bed drying. The water-redispersible polymer powder may comprise one or more compounds selected from protective colloids and anti-blocking agents. EP1498446A1 discloses methods and examples of producing such water-redispersible polymer powders, the entire contents of which is hereby expressly incorporated herein by reference.

The amount of polymer emulsion added can be in a range of 0.5 to 15% calculated as solids, based on the total weight of the overall system. In one non-limiting embodiment, the amount of polymer emulsion added can be in a range of 0.5 to 10% by weight, calculated as solids, based on the total weight of the overall system. If the amount of polymer emulsion added is less than the range, it may fail to achieve the desired durability and bonding force. If the amount of polymer emulsion added is more than the range, there may be a likelihood of air entrainment, resulting in drawbacks such as damaged surface appearance and a strength drop.

The hydraulic composition of the presently disclosed and claimed inventive concept(s) can be prepared separately or combined with the components described previously to form a dry cementitious tile adhesive. Specifically, a cement, aggregate, water reducing agent (fluidizing or dispersing agent), defoamer, cement retarder, accelerator, water-soluble cellulose ether and optional other components, and when a cement mortar composition is intended, by combining cement, aggregate, accelerator, cement retarder, water-soluble cellulose ether and optional other components, mixing them uniformly, adding water thereto, and further mixing.

As already mentioned above, the dry cement mortar according to the presently disclosed and claimed inventive concept(s) comprises a standard dry mortar formulation and the hydraulic composition as specified in detail above. In one non-limiting embodiment, the hydraulic composition can be present in an amount of about 0.3 to about 70 wt %, based on the total weight of the dry cement mortar. In another non-limiting embodiment, the hydraulic composition can be present from about 0.4 to about 30 wt %, based on the total weight of the dry cement mortar. In yet another non-limiting embodiment, the modified composition can be from about 0.5 to about 15 wt %, based on the total weight of the dry cement mortar.

The dry cement mortar of the presently disclosed and claimed inventive concept(s) can also have in combination therewith at least one mineral binder of hydrated lime, gypsum, pozzolana, blast furnace slag, hydraulically active calcium hydrosilicates and hydraulic lime. The at least one mineral binder can be present in the amount of about 0.1-70 wt %.

The presently disclosed and claimed inventive concept(s) also relates to a method of making a dry cement mortar. The method comprises admixing the hydraulic composition as specified in detail above to a standard dry mortar formulation. The compounds of the hydraulic composition can be admixed individually or in combination to the standard dry mortar formulation.

When preparing a dry cement mortar according to the presently disclosed and claimed inventive concept(s) the relative amounts of the mandatory and optional compounds in the hydraulic composition should be adapted to the total amounts needed in the final dry cement mortar. It is within the knowledge of a person skilled in the art to prepare a hydraulic composition with appropriate amounts of mandatory and optional compounds in the light of the amounts of the compounds already present in the standard dry mortar formulation. For example, but not by way of limitation, in case the standard dry mortar formulation already comprises cellulose ether additional amounts of cellulose ether(s) need not necessarily be added to the hydraulic composition according to the presently disclosed and claimed inventive concept(s). The total amounts of the various compounds in the final dry cement mortar should be in appropriate ranges which can be identified by the person skilled in the art based on his/her knowledge and routine tests.

The presently disclosed and claimed inventive concept(s) also provides a method of increasing the open time of a dry cement mortar without deteriorating the setting time. The method of increasing the open time comprises the steps of: a) admixing a hydraulic composition as specified in detail above to a standard dry mortar formulation, wherein the compounds of the hydraulic composition can be admixed individually or in combination to the standard dry mortar formulation, b) admixing water to the modified dry mortar formulation, and c) processing the water-containing modified dry mortar formulation in any standard manner.

For the end-use application, the dry cement mortar can be mixed with water and applied as wet material. In accordance with the presently disclosed and claimed inventive concept(s), the composition when used in a dry cementitious tile adhesive formulation can be mixed with a sufficient amount of water to produce a cementitious tile adhesive mortar. The water/cement ratio (water factor) can impact strength performance of cement based mortars. High water demand usually decreases strength values like tensile strength. However, the multivalent metal salts can offset the lack in strength performance at high water levels.

In the case of a cement mortar, water can be added in an amount of 10 to 80% by weight based on the total weight of the cement mortar. In one non-limiting embodiment, water can be added in an amount of 17 to 37% by weight. In another non-limiting embodiment, water can be added in an amount of 20 to 35% by weight.

The following examples illustrate the presently disclosed and claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLES

All the examples were conducted in a cementitious tile adhesive. The cellulose ether, the cement retarder and the accelerator used in the examples are described as follows.
Analytical Data of MHEC Samples Used in Examples

| | |
|---|---|
| Weight % Me (Methyl) | 26.5-28.5 |
| Weight % of EO (Hydroxylethyl) | 8.0-10.0 |
| Weight % of PO (Hydroxypropyl) | 0 |
| Brookfield viscosity RVT Spindle #6 [mPas], 20 rpm, 2% solution | 15000 |

Retarder:
A. Sodium Polyphosphate
B. Sodium Gluconate
Accelerator:
A. Sodium Thiocyanate, technical grade
B. Calcium Formate
C. Calcium Chloride Example 1

Visual Open Time Improvement

The performance properties were tested using the following cementitious tile adhesive formulation:

| Ingredient | Amount, wt % |
|---|---|
| Cement 52.5 R | 35 |
| Sand F35 | 64.4 |
| MHEC* | 0.40 |
| Cement Retarder | 0.05 |
| Accelerator | 0.15 |

*MHEC = Culminal ™ 4053, available from Ashland Inc. (Wilmington, DE, USA)

The cementitious tile adhesive was prepared, mixed and tested for open time according to ISO13007-2. For open time determination, the ready mixed mortar was applied with a notched trowel (6×6×6 mm) on a fibre cement plate. Every five minutes 5×5 cm earthenware and stoneware tiles were embedded by loading with a 2 kg weight for 30 seconds.

The tile was removed and the backside of the tile was judged. If more than 50% was covered with cementitious tile adhesive, open time was still ok. Open time was finished, if less than 50% was covered with cementitious tile adhesive.

Setting time was determined via measurement of ultrasonic wave velocity through the sample. The further the hydration proceeded the faster an ultrasonic wave was conducted through the mortar sample. Depending on the cement and mortar formulation the velocity of the ultrasonic wave approached a value of about 2400 m/s. Setting time was compared when half of the hydration was completed, thus a velocity of 1200 m/s was reached. The test results are shown in Table 1.

TABLE 1

| Sample | MHEC | Retarder | Accelerator | WF* | Open time, min SW** | Setting time, min |
|---|---|---|---|---|---|---|
| Reference | 0.4% | none | none | 0.26 | 30 | 950 |
| Sample 1 | 0.4% | 0.05% A | none | 0.26 | 45 | 1400 |
| Sample 2 | 0.4% | 0.05% A | 0.15% A | 0.26 | 55 | 860 |
| Sample 3 | 0.4% | 0.05% B | none | 0.26 | 60 | 1500 |
| Sample 4 | 0.4% | 0.05% B | 0.15% A | 0.26 | 40 | 1400 |
| Sample 5 | 0.4% | 0.05% A | 0.15% B | 0.26 | 40 | 930 |
| Sample 6 | 0.4% | 0.05% A | 0.15% C | 0.26 | 40 | 810 |

*WF: water factor; amount of used water divided by amount of used cementitious tile adhesive (CTA), e.g. 20 g of water on 100 g of CTA in a water factor of 0.2.
**SW: stoneware tiles As can be seen in Table 1 the addition of the retarder alone improves the open time by 15 minutes (Sample 1) and 30 minutes (Sample 3) but also strongly retards the setting by 450 minutes (Sample 1) and 550 minutes (Sample 3) in comparison to the reference. When the combination of retarder and accelerator is added, the open time is prolonged by 25 minutes (Sample 2) and 10 minutes (Samples 4-6) in comparison to the reference. But the setting time is comparable to the reference or even faster.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims.

What is claimed is:

1. A composition, comprising:
   sodium polyphosphate; and
   at least one accelerator selected from the group consisting of sodium thiocyanate, calcium formate, calcium chloride, and combinations thereof,
   wherein when the composition is combined with a cementitious tile adhesive that (a) has a water factor of 0.26 and (b) comprises 0.4 wt % methyl hydroxyethyl cellulose, 35 wt % Cement 52.5 R, and 64.4 wt % Sand F35 on a dry weight basis, to produce a product, the product has (i) an open time in a range of from about 40 minutes to about 55 minutes and (ii) a setting time in a range of from about 800 minutes to about 950 minutes.

2. The hydraulic composition of claim 1, further comprising a cellulose ether.

3. The hydraulic composition of claim 2, wherein the cellulose ether is selected from the group consisting of alkylcelluloses, hydroxyalkylcelllluloses, alkylhydroxyalkylcelluloses, and combinations thereof.

4. A dry cement mortar, comprising:
   cement;
   sodium polyphosphate; and
   at least one accelerator selected from the group consisting of sodium thiocyanate, calcium formate, calcium chloride, and combinations thereof.

5. The dry cement mortar of claim 4, wherein the sodium polyphosphate is in a range of about 0.001 to about 0.5 wt % based on the total weight of the dry cement mortar.

6. The dry cement mortar of claim 5, wherein the sodium polyphosphate is in a range of about 0.005 to about 0.3 wt % based on the total weight of the dry cement mortar.

7. The dry cement mortar of claim 6, wherein the sodium polyphosphate is in a range of about 0.01 to about 0.05 wt % based on the total weight of the dry cement mortar.

8. The dry cement mortar of claim 4, wherein the accelerator is in a range of about 0.01 to about 1 wt % based on the total weight of the dry cement mortar.

9. The dry cement mortar of claim 8, wherein the accelerator is in a range of about 0.05 to about 0.5 wt % based on the total weight of the dry cement mortar.

10. The dry cement mortar of claim 9, wherein the accelerator is in a range of about 0.1 to about 0.3 wt % based on the total weight of the dry cement mortar.

11. A method for making a cementitious tile adhesive comprising the steps of:
    mixing the hydraulic composition of claim 1, a cement and an optional component; and
    admixing the amount of water required for processing to a settable mortar.

* * * * *